(12) United States Patent
Cao

(10) Patent No.: US 7,967,514 B2
(45) Date of Patent: Jun. 28, 2011

(54) DUST PROTECTOR FOR CAMERA MODULE AND PORTABLE ELECTRONIC DEVICE USING THE SAME

(75) Inventor: Jin-Ti Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 187 days.

(21) Appl. No.: 12/343,108

(22) Filed: Dec. 23, 2008

(65) Prior Publication Data

US 2010/0124415 A1 May 20, 2010

(30) Foreign Application Priority Data

Nov. 20, 2008 (CN) .......................... 2008 1 0305658

(51) Int. Cl.
*G03B 17/02* (2006.01)
(52) U.S. Cl. ...................... 396/448; 396/429; 455/575.1
(58) Field of Classification Search .................. 396/448; 455/575.1
See application file for complete search history.

(56) References Cited

U.S. PATENT DOCUMENTS

| 4,007,471 | A  | * | 2/1977 | Land et al. ..................... 396/544 |
| 4,385,812 | A  | * | 5/1983 | Wille et al. .................... 359/511 |
| 6,215,604 | B1 | * | 4/2001 | Hori ............................... 359/819 |
| 7,038,864 | B2 | * | 5/2006 | Rose .............................. 359/819 |
| 7,315,417 | B2 | * | 1/2008 | Chen et al. ..................... 359/450 |
| 2003/0043728 | A1 | * | 3/2003 | Kan et al. ....................... 369/244 |
| 2006/0139774 | A1 | * | 6/2006 | Pfnuer et al. .................. 359/819 |
| 2008/0044173 | A1 | * | 2/2008 | Wang et al. .................... 396/448 |
| 2008/0216579 | A1 | * | 9/2008 | Hoffman ........................ 73/708 |

FOREIGN PATENT DOCUMENTS

JP          07272302 A  * 10/1995

* cited by examiner

*Primary Examiner* — Clayton E Laballe
*Assistant Examiner* — Leon W Rhodes
(74) *Attorney, Agent, or Firm* — D. Austin Bonderer

(57) ABSTRACT

A dust protector module comprises a protective cover and a decorative element. The decorative element defines a receiving area corresponding to the protective cover, the receiving area has the same shape and a smaller size than the protective cover. Therefore, the protective cover is frictionally engaged in the receiving area.

3 Claims, 5 Drawing Sheets

DUST PROTECTOR FOR CAMERA MODULE AND PORTABLE ELECTRONIC DEVICE USING THE SAME

BACKGROUND

1. Technical Field

The present disclosure relates to dust protectors modules, particularly to a dust protector module used in a portable electronic device.

2. Description of Related Art

Many electronic devices, such as mobile phones, have any one of a variety of camera modules mounted therein so as to enable them to take pictures. A camera module used in an electronic device is typically received in a housing. The housing has a dust protector module, which functions as a view panel allowing light to enter into the camera module and which also functions as a protective member, preventing the camera module being damaged or soiled.

Referring to FIG. 5, a typical dust protector module 1 includes a transparent protective cover 2 and a decorative element 3 overlapping the protective cover 2. The protective cover 2 and the decorative element 3 are each manufactured by a different molding process. The protective cover 2 adheres to a housing portion 4 of a portable electronic device using an adhesive layer (not shown). The decorative element 3 adheres to the protective cover 2 to improve the decorative quality of the portable electronic device. However, the protective cover 2 may easily become detached from the housing portion 4 during use, as the adhesive layer can degrade with time. As a result of even partial detachment, moisture and dust can enter into the housing portion 4, affecting the camera module.

Therefore, there is room for improvement within the art.

BRIEF DESCRIPTION OF THE DRAWINGS

Many aspects of the exemplary dust protector module and portable electronic device using the dust protector module can be better understood with reference to the following drawings. These drawings are not necessarily drawn to scale, the emphasis instead being placed upon clearly illustrating the principles of the exemplary dust protector module and portable electronic device using the dust protector module. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
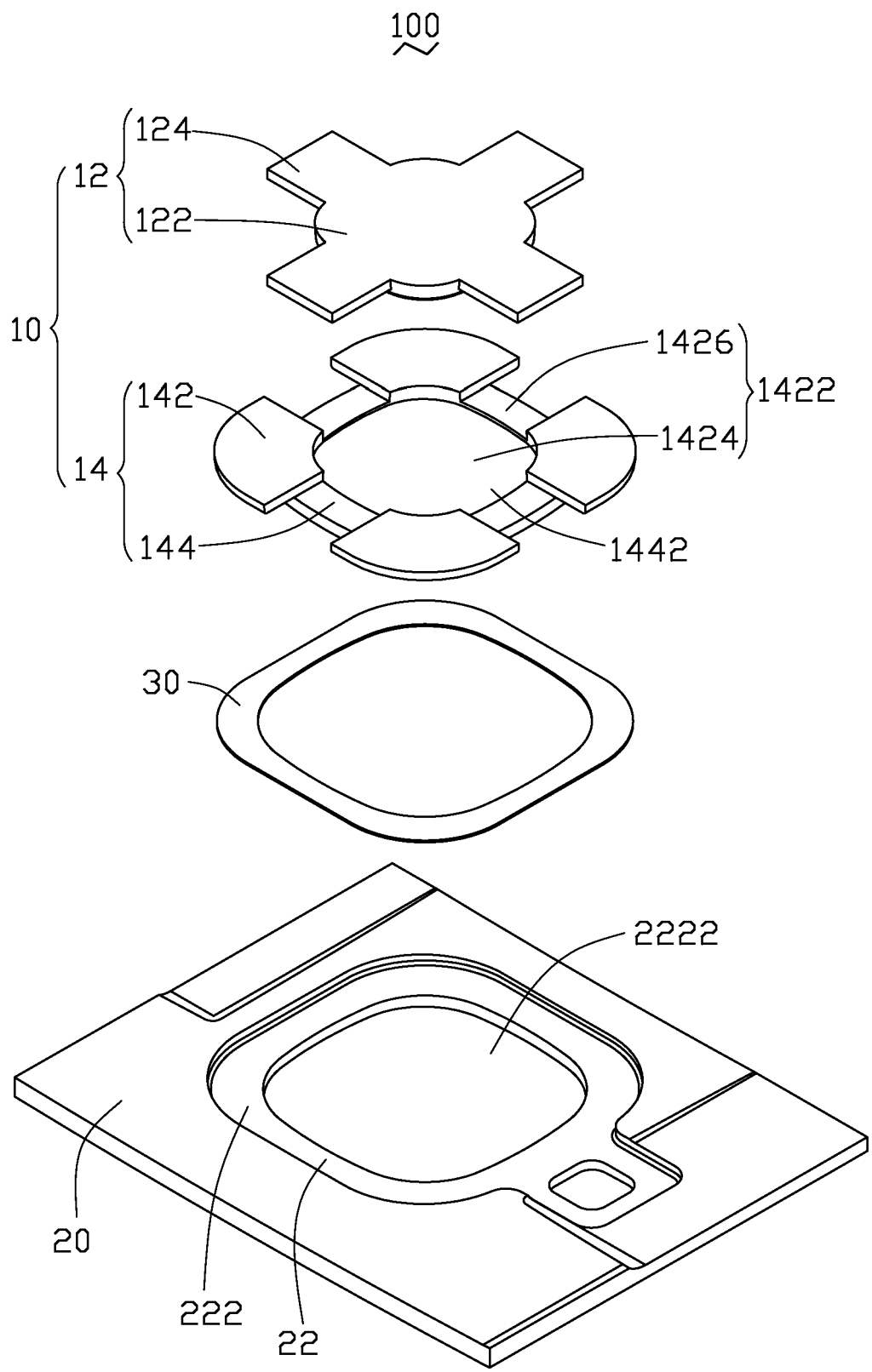
FIG. 1 is an exploded view of a portion of a portable electronic device with a dust protector module in accordance with an exemplary embodiment.

Exemplary embodiments will now be described in detail below and with reference to the drawings. Referring to FIG. 1, a portion of a portable electronic device 100, such as a mobile phone, includes a housing 20 and a dust protector module 10 adhered to the housing 20 by an adhesive 30. The dust protector module 10 is used to protect a camera module (not shown) mounted within the housing 20.

The dust protector module 10 includes a transparent protective cover 12 and a decorative element 14 frictionally attached to the protective cover 12. The protective cover 12 includes a base 122 and a plurality of, e.g., four, securing portions 124. The securing portions are symmetrically projected away from an outer peripheral wall of the base 122. The base 122 may be circular as shown herein, or of another shape, such as rectangular.

Figure 2:
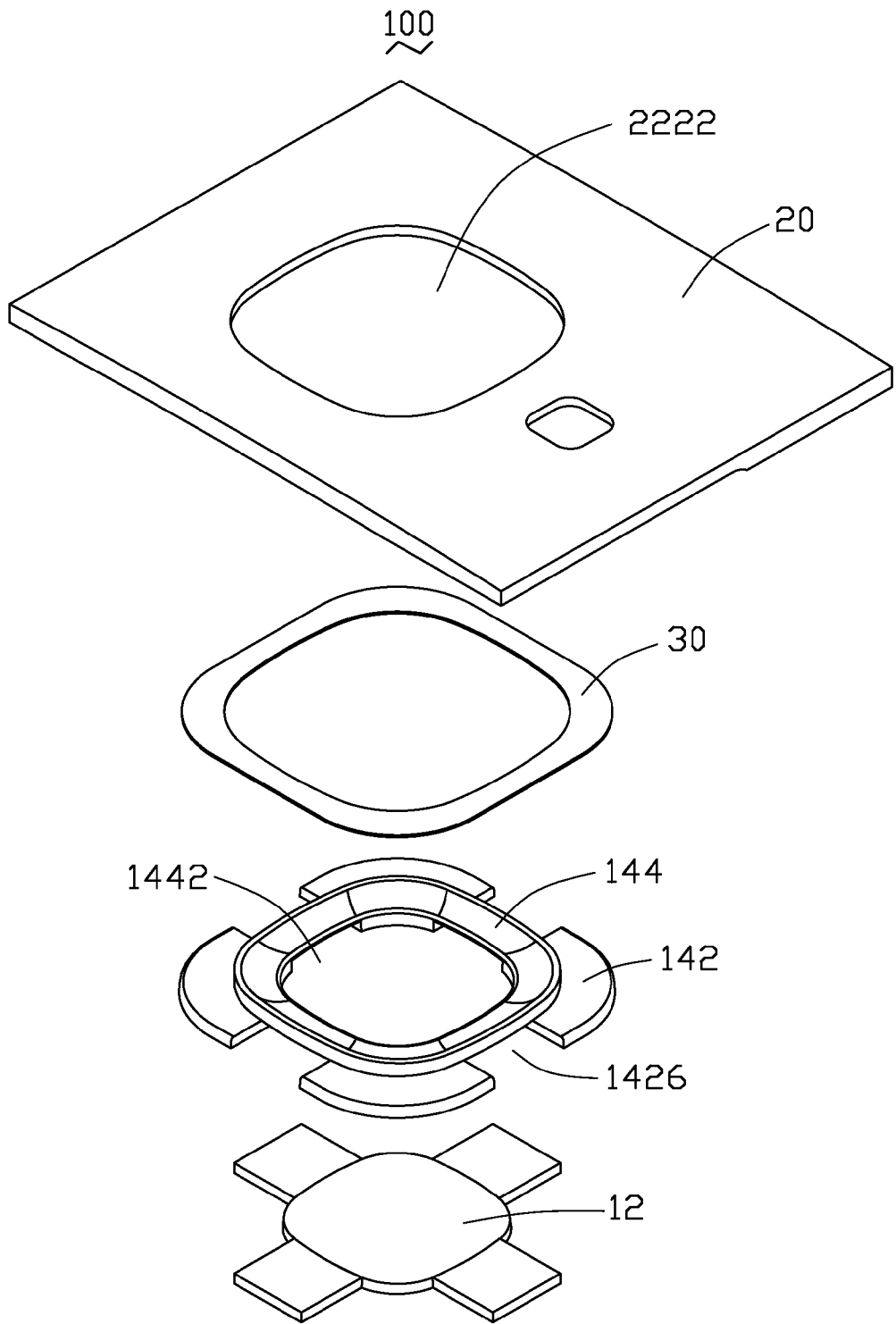
FIG. 2 is an exploded view from another aspect of the portion of the portable electronic device shown in FIG. 1.

Referring to FIG. 2, the decorative element 14 includes a latching section 142 and a mating section 144 partially overlapping the latching section 142. The latching section 142 and the mating section can be integrally formed together by such means as molding or by adhesive. The latching section 142 is annular and defines a receiving area 1422 for receiving the protective cover 12. The receiving area 1422 includes a first hole 1424 configured for accommodating the base 122 and a plurality of latching troughs 1426 configured for latching with the securing portions 124. The first hole 1424 has the same shape as the base 122, but is slightly smaller than the base 122. The latching troughs 1426 have the same shape as the securing portions 124, but are slightly smaller than the securing portions 124. The difference in size between the first hole 1424 and the base 122 and the troughs 1426 and the securing portions 124 is just enough to allow a friction engagement between the respective components.

The mating section 144 is smaller than the latching section 142. Accordingly, The latching section 144 partially overlaps the mating section 142, to form a bottom surface of the latching troughs 1426. The center of the mating section 144 defines a second hole 1442 corresponding to the first hole 1424. The second hole 1442 allows the light to transmit through the protective cover 12 and the mating section 144. The mating section 144 engages with the housing 20.

The housing 20 defines a receiving groove 22 having a bottom wall 222 for receiving the dust protector module I O therein. The housing 20 defines a mating hole 2222 corresponding to the first hole 1424 and the second hole 1442. The mating hole 2222 has the same shape as the mating section 144, but is slightly smaller than the mating section 144 so as to allow for the creation of a friction engagement. The mating hole 2222 is configured for accommodating the mating section 144.

Figure 3:
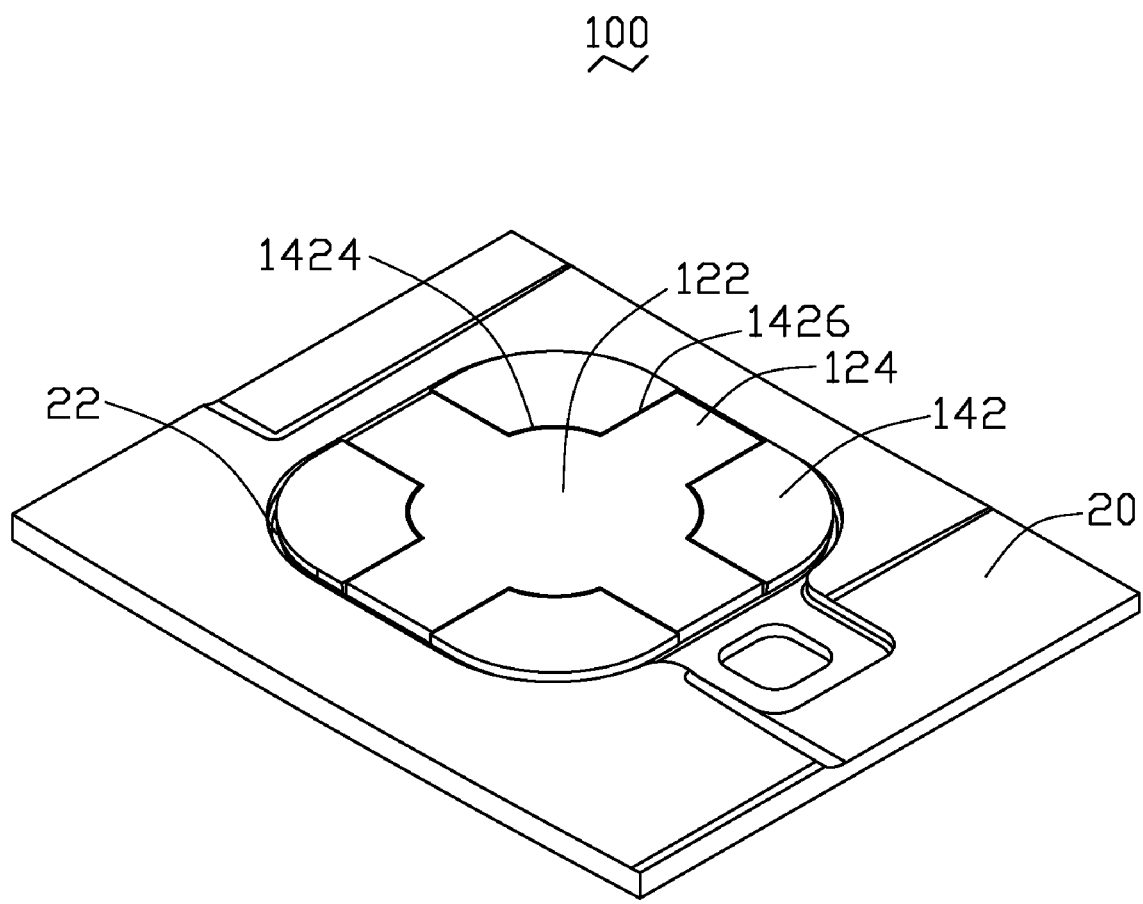
FIG. 3 is an assembled view of the portion of the portable electronic device shown In FIG. 1.
Figure 4:
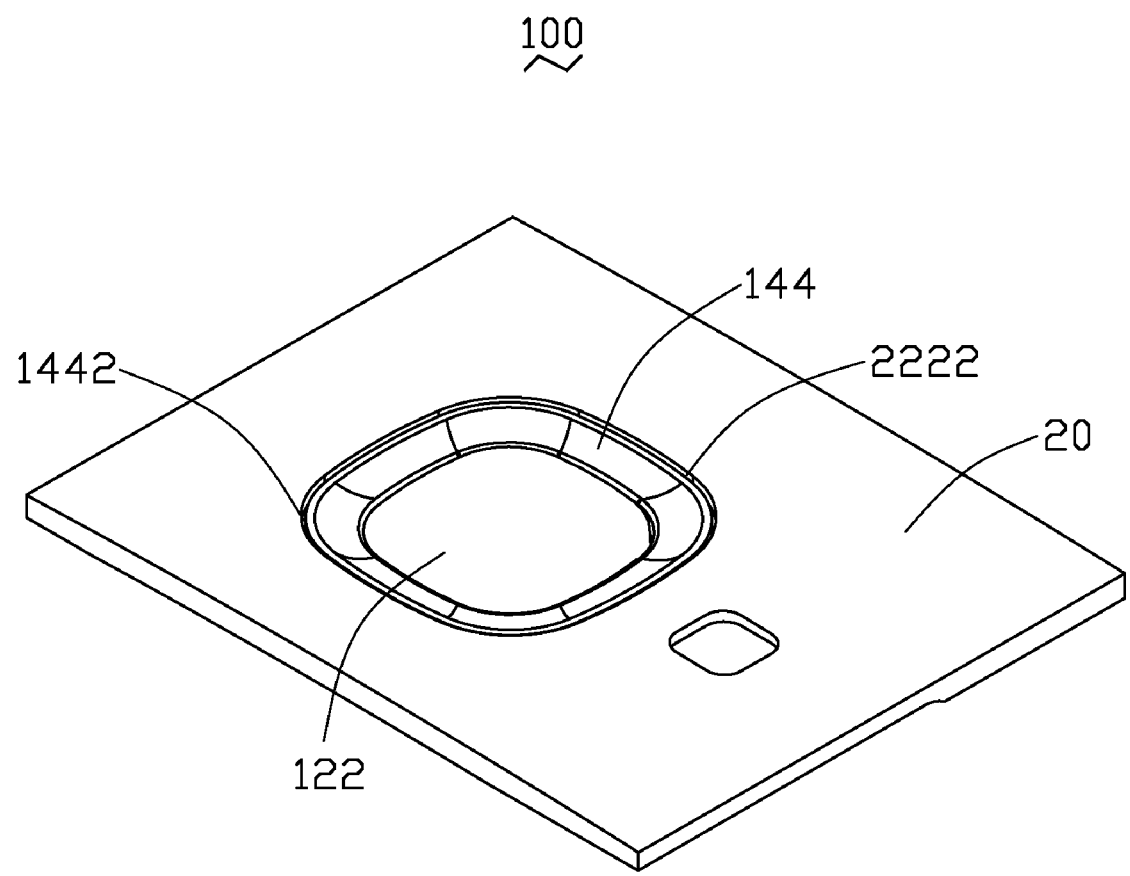
FIG. 4 is an assembled view of the portion of the portable electronic device shown In FIG. 2.
Figure 5:
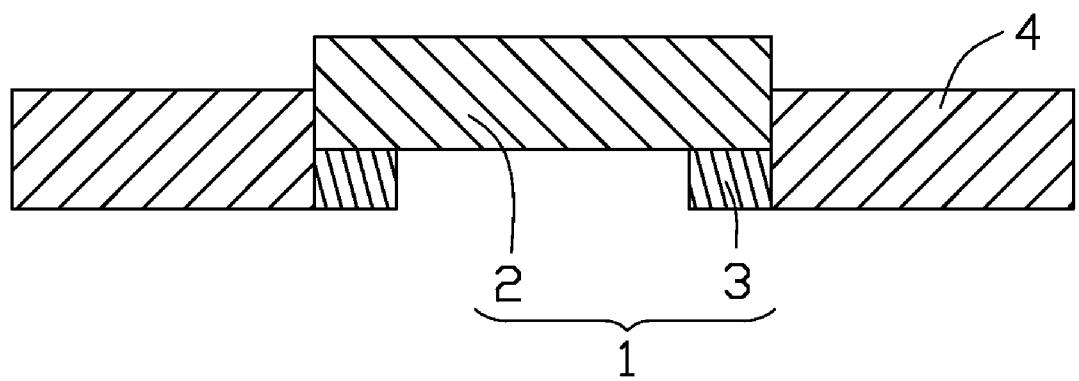
FIG. 5 is a schematic view of a portion of a typical portable electronic device.

Referring to FIGS. 3 and 4, to assemble the portable electronic device 100, firstly, the base 122 is aligned with the first hole 1424, and the securing portions 124 are aligned with the latching troughs 1426. Then, the protective cover 12 is pressed toward the decorative element 14 until the base 122 is accommodated in the first hole 1424 and the securing portions 124 latch into the latching troughs 1426. Because the first hole 1424 is smaller than the base 122 and the latching troughs 1426 are slightly smaller than the securing portions 124, a snapping or friction engagement occurs between the sides of the first hole 1424 and the base 122, and between the latching troughs 1426 and the securing portions 124, with a result that the protective cover 12 is stably latched to the decorative element 14, to form the dust protector module 10. The adhesive 30 is attached to the bottom wall 222 of the receiving groove 22. After that, the mating section 144 is aligned with the mating hole 2222, then the dust protector module 10 is pressed toward the housing 20 until the mating section 144 is latched into the mating hole 2222 and the latching section 142 is adhered to the adhesive 30. At this stage, because the mating hole 2222 is slightly smaller than the mating section 144, there is tight engagement between the sides of the mating hole 2222 and the mating section 144, thereby the dust protector module 10 is stably received in the receiving groove secured by the bond formed with the adhesive 30 and the tight engagement between the sides of the mating hole 2222 and the mating section 144 and able to prevent dust and moisture from entering the camera module.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
a housing; and
a dust protector module, including a protective cover and a decorative element, the decorative element defining a receiving area corresponding to the protective cover;
wherein the protective cover includes a base and a plurality of securing portions projecting away from an outer circumferential surface of the base around the base; the receiving area includes a first hole for accommodating the base and a plurality of latching troughs for accommodating the securing portions; the decorative element includes a latching section and a mating section, the receiving area is defined in the latching section, the mating section overlaps a surface of the latching section to form a bottom surface of the receiving area the mating section defines a second hole corresponding to the first hole, the second hole allows the light transmitted from the protective cover to pass through the mating section; the housing defines a mating hole corresponding to the first hole and the second hole, the mating hole has the same shape and a smaller size as the mating section , the mating section accommodated in the mating hole.

2. The portable electronic device as claimed in claim 1, wherein the first hole has the same shape and a smaller size as the base, and the latching troughs have the same shape and a smaller size as the securing portions.

3. The portable electronic device as claimed in claim 1, wherein the housing defines a receiving groove for receiving the dust protector module and defining a bottom wall, the mating hole defined in the bottom wall.

\* \* \* \* \*